United States Patent [19]
Hall

[11] 3,824,595
[45] July 16, 1974

[54] HIGH ACCURACY DIRECTION FINDING SYSTEM

[75] Inventor: Stanley Rylon Hall, Ellicott City, Md.

[73] Assignee: The Bunker-Ramo Corporation, Oak Brook, Ill.

[22] Filed: June 4, 1971

[21] Appl. No.: 149,949

[52] U.S. Cl. .......................... 343/113 R, 343/119
[51] Int. Cl. ............................................. G01s 3/48
[58] Field of Search .......... 343/113 R, 119 R, 16 R, 343/100 CL, 114 R

[56] References Cited
UNITED STATES PATENTS

| | | | |
|---|---|---|---|
| 3,165,746 | 1/1965 | Whitnah | 343/119 |
| 3,175,217 | 3/1965 | Kaiser et al. | 343/113 R |
| 3,396,395 | 8/1968 | Ball et al. | 343/113 R |
| 3,540,053 | 11/1970 | Sparagna et al. | 343/113 R |
| 3,665,481 | 5/1972 | Woo | 343/113 R |
| 3,683,385 | 8/1972 | Corzine et al. | 343/113 R |

*Primary Examiner*—T. H. Tubbesing
*Assistant Examiner*—T. M. Blum
*Attorney, Agent, or Firm*—N. Cass; Frederick M. Arbuckle

[57] ABSTRACT

A method and apparatus for performing high accuracy direction finding. The amplitude difference and phase difference of a signal as received at a single pair of squinted antennas are determined. A fine but ambiguous indication of the direction is generated from the determined phase difference and a rough but unambiguous indication of direction is generated from the determined amplitude difference. The rough unambiguous indication is then utilized to resolve the ambiguity of the fine indication.

33 Claims, 12 Drawing Figures

INVENTOR
Stanley R. Hall

| REGION NO. | MAXIMUM BOUNDARY | | BINARY | | | | |
|---|---|---|---|---|---|---|---|
| | SIN θ | θ (DEG) | SIN θ | SIN θ/f₀ | | | |
| | | | | A₄ | A₃ | A₂ | A₁ |
| 8 | 0.9375 | 69.6 | 0.111 | 1 | 0 | 1 | 0 |
| 7 | 0.8125 | 54.3 | 0.110 | 1 | 0 | 0 | 0 |
| 6 | 0.6875 | 43.4 | 0.101 | 0 | 1 | 1 | 1 |
| 5 | 0.5625 | 34.2 | 0.100 | | 1 | 1 | 0 |
| 4 | 0.4375 | 25.9 | 0.011 | | 1 | 0 | 0 |
| 3 | 0.3125 | 18.2 | 0.010 | | | 1 | 1 |
| 2 | 0.1875 | 10.8 | 0.001 | | | 1 | 0 |
| 1 | 0.0625 | 3.6 | 0.000 | | | | 0 |

INVENTOR
Stanley R. Hall

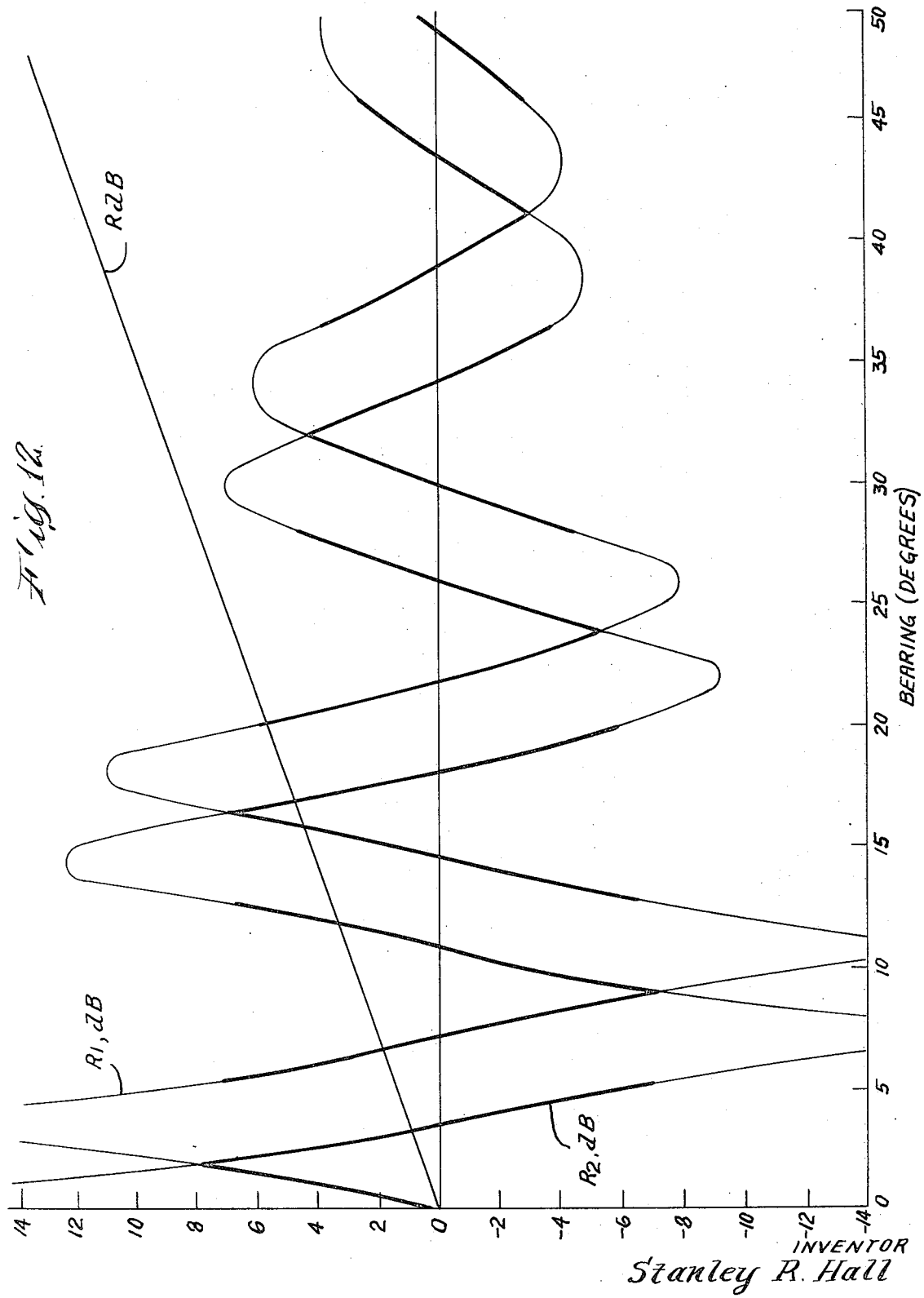

ered by a radar source or homing device.
HIGH ACCURACY DIRECTION FINDING SYSTEM This invention relates to direction finding systems, and more particularly to a system for utilizing phase and amplitude information derived from a single pair of squinted antennas to obtain a high accuracy direction of arrival indication for an electrical signal.

BACKGROUND OF THE INVENTION

There are numerous applications in, for example, electronic warfare, and navigational and related systems where a requirement exists for a high accuracy determination of the direction of arrival of an electrical signal. The signal could, for example, be that generated by a radar source or homing device.

The conventional methods employed for performing the direction finding function have been amplitude comparison with a pair of squinted antennas or phase comparison with a pair of spaced antennas. With amplitude comparison, a pair of antennas each squinted from mechanical boresight is employed. Since the boresights of the antennas are pointed in different directions, the response curves of the antennas for signals arriving at different angles are different. By comparing the amplitude responses of the two antennas to a given input signal, an indication may be derived of the signal angle of arrival. This technique supplies unambiguous results. However, high accuracy is not obtainable using this technique and even relatively small errors introduced by circuit components or the like can cause an error of several degrees in the computed angle of arrival. This technique is thus not suitable in applications where high accuracy is required.

Phase comparison techniques make use of the fact that the time of arrival of a signal at a pair of spaced antennas will differ by an amount which varies as a function of the angle of arrival of the incoming signal. Various processing techniques are available for determining angle of arrival from phase difference information derived from the antennas. These include processes which operate directly with phase information and processes which convert the phase information into amplitude values for processing. In all of these techniques a trade-off is required. Since the responses of the antennas are various cyclic waveforms, unambiguous readings can be obtained only with a single cycle of the antenna response waveform in scanning the field of view. It can be shown that for this condition to exist, the maximum antenna spacing cannot exceed one-half wavelength of the maximum frequency which a system is designed to receive. (i.e. $\lambda$ max/2). However, increased antenna spacing results in a more sharply sloped phase response curve and thus improved direction finding accuracy and error insensitivity. But, where the antenna spacing is wide enough to provide accurate readings, an ambiguity exists as to the cycle of the multiple cycle response waveform which relates to a determined phase (i.e. the phase may exist at the corresponding point on any one of the waveform cycles, the successive possible points at which the determined phase may occur being generally spaced from each other by $2\pi$ radians) and additional information is required in order to resolve this ambiguity.

While various systems have been proposed in the past for resolving the ambiguity indicated above to provide accurate, unambiguous direction finding readings, these systems have normally involved the use of two or more sets of antennas. This has resulted in antenna, receiver, and processing subsystems which are both complicated and expensive. In addition, some of these systems have required the receipt of more than one input pulse in order to make the direction finding determination. In many applications, a requirement exists that this determination be made on the basis of a single received input pulse.

It is thus a primary object of this invention to provide an improved direction finding system.

A more specific object of this invention is to provide a direction finding system which provides high accuracy, unambiguous readings with relatively good error insensitivity.

Another object of this invention is to provide a direction finding system of the type indicated above which requires the use of only a single pair of antennas, and is thus relatively simple and inexpensive.

A further object of this invention is to provide a direction finding system of the type indicated above which is adapted to make the direction finding determination on the basis of a single received pulse.

BRIEF DESCRIPTION OF INVENTION

In accordance with these objects this invention provides a system for determining the direction of arrival of an electrical signal. The responses from a single pair of separated squinted antennas are utilized for determining phase and amplitude differences in the signals received by the antennas. A means is provided which is responsive to the phase difference between the received antenna signals for generating a fine, ambiguous indication of the direction, and a means is provided which is responsive to the amplitude difference between the received antenna signals for generating a rough, unambiguous indication of the direction. The rough unambiguous direction indication is then utilized by a suitable means to resolve the ambiguity of the fine indication. The phase difference determination and the ambiguity resolving operation may be performed in either the amplitude or the phase domain with comparable results being obtained utilizing either method.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 6 is a diagram illustrating the ambiguity logic for the embodiment of the invention shown in FIG. 4.

FIG. 12 is a diagram illustrating typical waveforms in the output of the receiver subsystem for the embodiment of the invention shown in FIG. 10.

DETAILED DESCRIPTION OF PREFERRED EMBODIMENT

Figure 1:
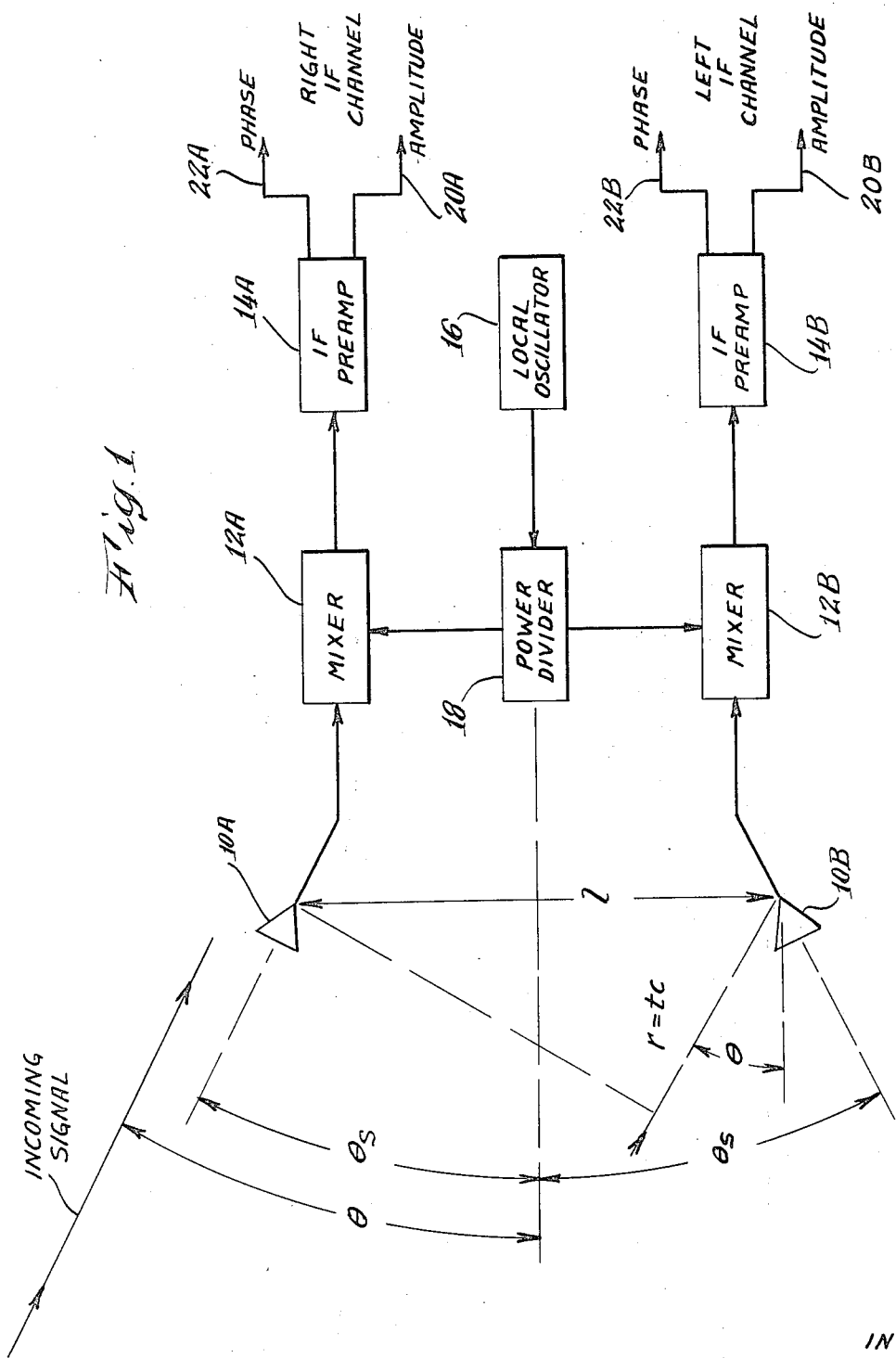
FIG. 1 is a block diagram of the antenna subsystem for a preferred embodiment of the invention also illustrating some of the parameters involved in the determination.

Referring now to FIG. 1, it is seen that the antenna subsystem consists of two channels. Each channel contains an antenna 10, which may, for example, be a spiral antenna, a phase tracked mixer 12, and an IF preamplifier 14. The antennas 10 are squinted at an angle $\theta_S$ from mechanical boresight to provide for the amplitude response and are separated by a distance $l$ to provide the phase response. Squint angle $\theta_S$ might, for example, be 28.5° and $l$ might be a 4 λ max. A local oscillator 16 is connected through a power divider 18 to one input to each of the mixers 12. The other inputs to each of the mixers 12 is the antenna response from the corresponding antenna 10. Each of the preamplifiers 14 generates an output on a line 20 which is proportional to the amplitude of the corresponding antenna response and an output on a line 22 which is proportional to the phase of the corresponding antenna response.

To determine the signal which appears on each of the amplitude lines 20, it should be noted that the equation for the antenna response of a spiral antenna is $$E = E_o \, e^{-1.388 \, (\theta/\theta_B)^2} \tag{1}$$

where
E = antenna response
$E_o$ = received voltage at antenna boresight
$\theta_B$ = antenna 3-dB beamwidth
$\theta$ = angle of received signal (bearing angle).

With antennas 10 squinted, the response of the right antenna $E_R$ to an incoming signal at $\theta$ is $$E_R = E_o \, e^{\{-1.388[(\theta - \theta_S)/\theta_B]^2\}} \tag{2}$$

Equation 2 indicates the value of the amplitude appearing on right channel amplitude line 20A. The amplitude appearing on left channel amplitude line 20B may similarly be determined from the left channel antenna response equation which is:

$$E_L = E_o \, e^{\{-1.388[(\theta_S + \theta)/\theta_B]^2\}} \tag{3}$$

To determine the phase signals on lines 22A and 22B, it is noted that the outputs of antennas 10A and 10B may be represented as:

$$V_A = \text{COS } \omega_R t \tag{4}$$
$$V_B = \text{COS } (\omega_R t - \phi) \tag{5}$$

where $\omega_R$ equals radian frequency of received signal and $\phi$ is the electrical phase difference occurring between $V_A$ and $V_B$ as a result of the separation between antennas 10A and 10B and the angle of arrival $\theta$ of the received signal.

The output from the mixers 12 modify equations 4 and 5 as follows:

$$V'_A = \tfrac{1}{2} \text{ COS } (\omega_R - \omega_L) \, t \tag{6}$$
$$V'_B = \tfrac{1}{2} \text{ COS } [(\omega_R - \omega_L) t - \phi] \tag{7}$$

where $\omega_L$ is the radian frequency of local oscillator 16.

The values represented by equations 6 and 7 are presented on the lines 22A and 22B respectively.

RECEIVER SUBSYSTEM

Figure 2:
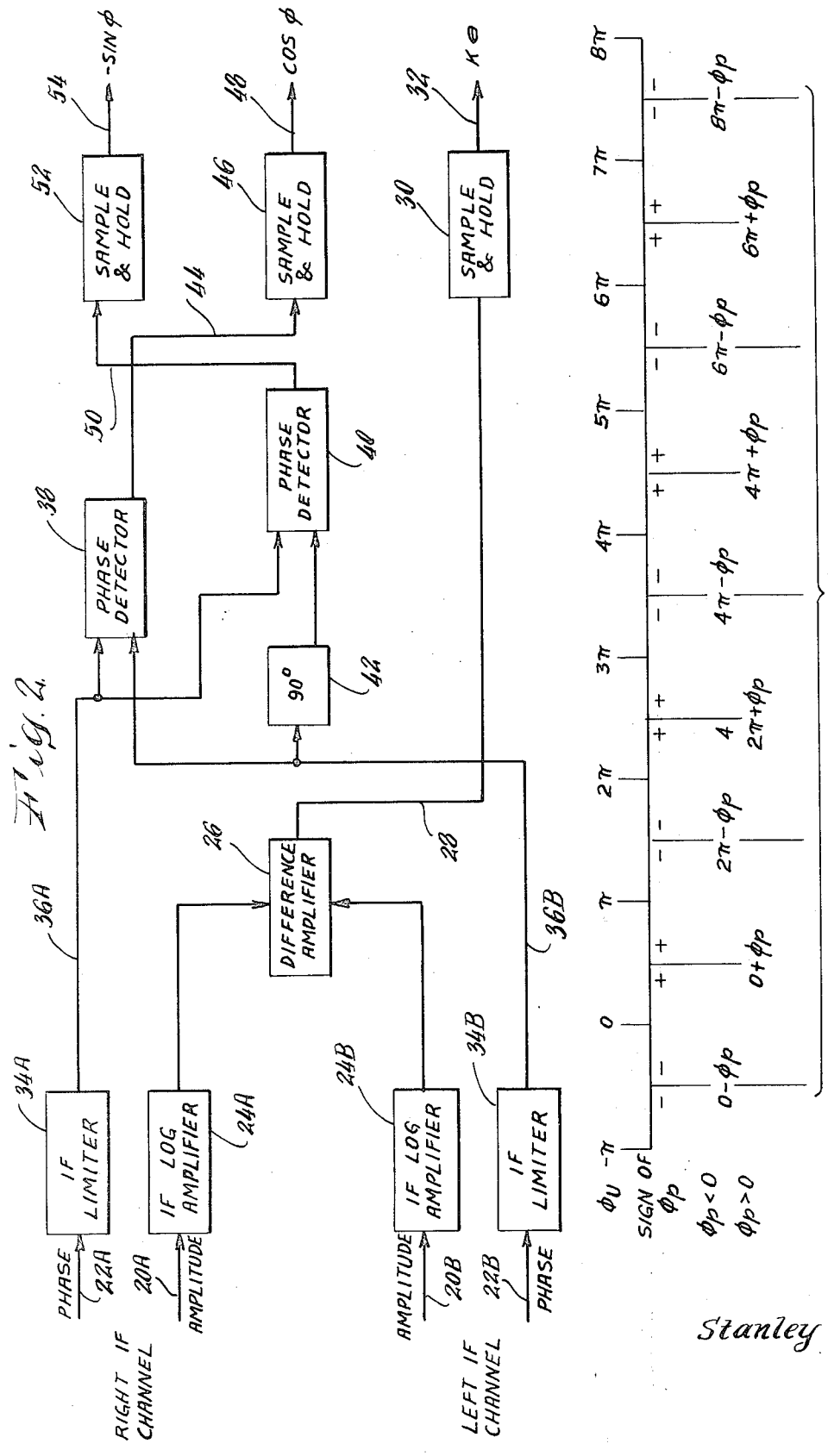
FIG. 2 is a block schematic diagram of the receiver subsystem for a preferred embodiment of the invention.

Referring now to FIG. 2, it is seen that the amplitude values on lines 20A and 20B are each applied through an IF log amplifier 24 to one input of a difference amplifier 26. The output from difference amplifier 26 on line 28, which value is stored in sample and hold circuit 30, is equal to:

$$\log E_R - \log E_L = \log (E_R/E_L) \tag{8}$$

From equations 2 and 3, it can be determined that $$\frac{E_R}{E_L} = e^{\{5.552[\theta \theta_S)/(\theta_B{}^2)]\}} \tag{9}$$

The ratio of equation (9) expressed in dB ($R_{dB}$) is $$R_{dB} = 20 \log \frac{E_R}{E_L}$$
$$= 20 \log e^{\{5.552[(\theta \theta_S)/(\Theta_B{}^2)]\}} \tag{10}$$

Since $\log x = 0.434 \ln x$, $$R_{dB} = 20 \, (0.434) \ln e^{\{5.552[(\theta \theta_S)/(\theta_B{}^2)]\}}$$
$$= 8.68(5.552)(\theta \theta_S)/\theta_B{}^2 \tag{11}$$

$$0 \leq |\theta| \leq |\pi|.$$

Since for a given antenna configuration, the squint angle $\theta_S$ and the antenna beamwidth $\theta_B$ are known, equation 11 may be written as $$R_{dB} = 8.68 k\theta = K\theta \tag{12}$$

From equation 12, it is seen that the value appearing on output line 32 from sample and hold circuit 30 is directly proportional to the direction of arrival angle $\theta$ (see FIG. 1) as determined from the amplitude response of the pair of squinted antenna.

The phase signals on lines 22A and 22B are each passed through a corresponding IF limiter 34 to eliminate amplitude effects. The resulting signals on lines 36 may be considered to be of unity amplitude. Lines 36 are connected as the inputs to phase detector 38, with the right channel 36A also being connected as one input to phase detector 40 and the left channel line 36B being delayed by 90° in circuit 42 and applied to the other input to detector 40. The response of phase detector 38 is $$E_1 = \cos \phi \tag{13}$$

This value is applied through line 44 and stored in sample and hold 46. The value stored in sample and hold 46 is available on circuit output line 48. The response of phase detector 40 is $$E_2 = \cos (\phi + 90°)$$

$$= -\sin \phi \quad (14)$$

This value is applied through line 50 and stored in sample and hold 52. The value stored in sample and hold 52 is available on circuit output line 54.

At this point it should be noted that the cosine function on line 48, since it is even, cannot resolve the difference between $\phi > 0$ and $\phi < 0$ and can only give an unambiguous response for $0 \leq |\phi| \leq |\pi|$. The sine function on line 54 is required to obtain response polarity.

As may be seen from equation 12, a plot of the signal appearing on line 32 versus $\theta$ is a straight line having a slope K. Since $\theta_B$ is normally relatively large, for example 70°, K is usually relatively small (normally 0.3 or less). The curve for $K\theta$ ($e1$) shown in FIG. 3 thus has a relatively shallow slope, providing relatively poor accuracy and relatively large bearing errors for small errors in the computed value. This curve is thus not suitable alone for accurately determining direction of arrival.

Figure 3:
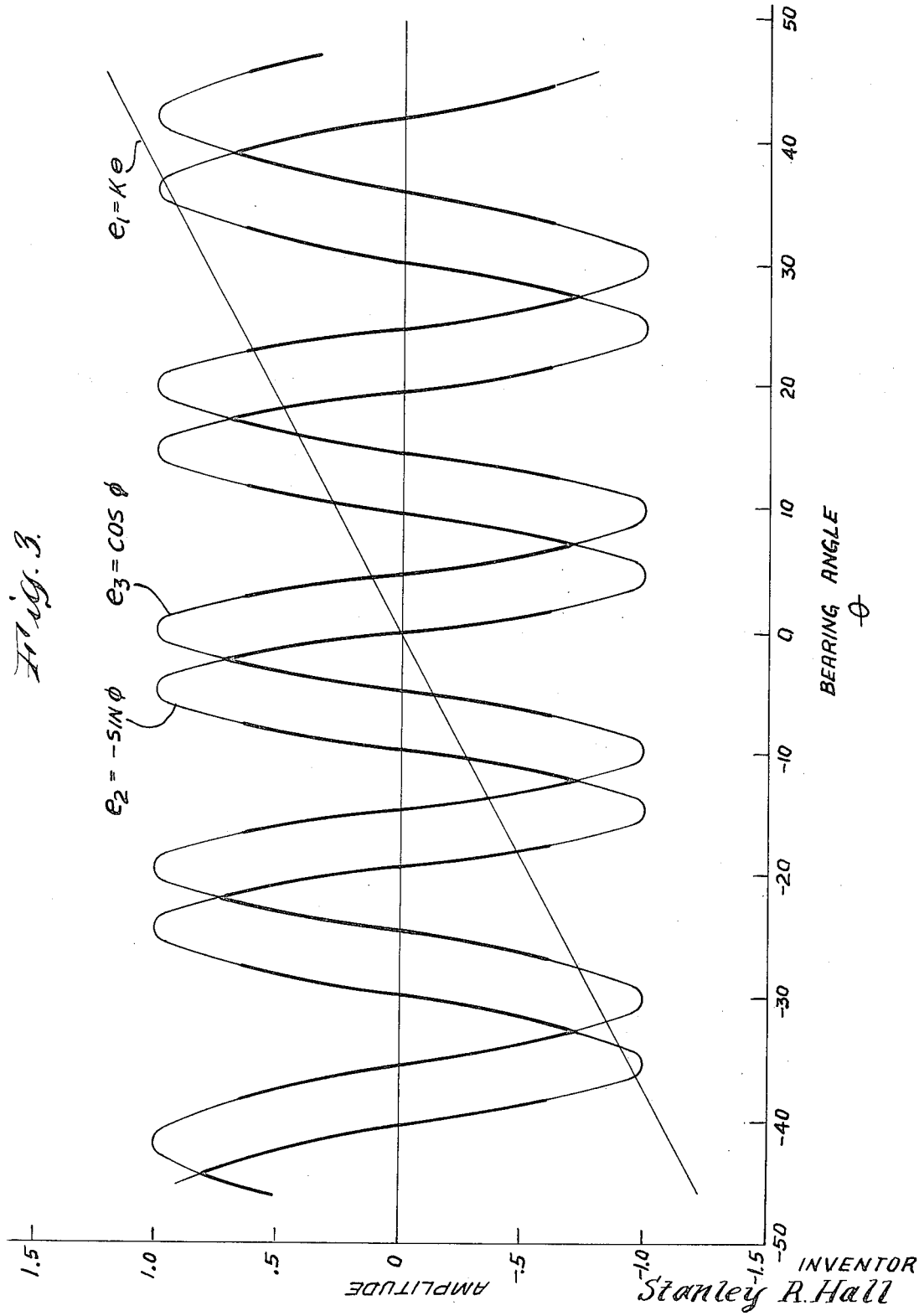
FIG. 3 is a diagram illustrating typical waveforms at the output from the receiver subsystem for a preferred embodiment of the invention.

FIG. 3 also shows a plot of $-\sin \phi$ ($e2$) and $\cos \phi$ ($e3$) as a function of bearing angle $\theta$ for a typical antenna spacing and frequency signal. It is seen that the sine and the cosine curves in FIG. 3 have sharply sloped curves. This slope may be maximized by utilizing only the curve having the lowest absolute value for each value of $\theta$ in making the determination. The portions of the curves which are utilized following this rule are outlined with heavy line in FIG. 3. It is seen that these segments are sharply sloped and nearly straight providing high direction finding accuracy and relatively small errors in angle determination from computational errors. However, it is seen that the same phase value may appear five times over the field of view, each of the occurrences of a particular value being spaced by $2\pi$ radians from the preceeding one. Thus, the accurate angle determinations obtained by phase comparison are highly ambiguous. The angle processor to now be described utilizes the rough amplitude-comparison determined angle of arrival to resolve this ambiguity.

ANGLE PROCESSOR

Figure 4:
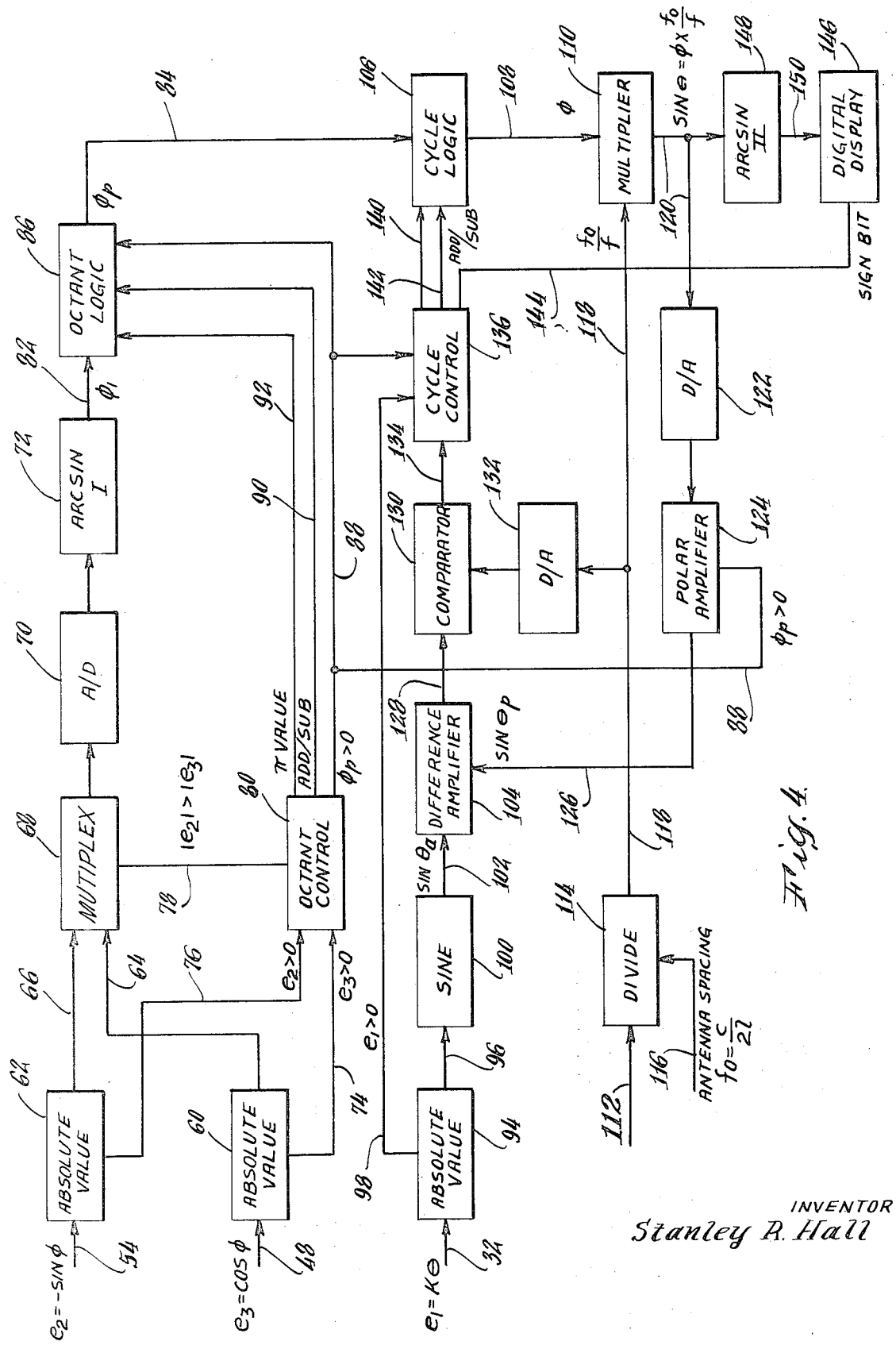
FIG. 4 is a schematic block diagram of the angle processor for a preferred embodiment of the invention.

Referring now to FIG. 4, the first operation performed by the angle processor is to compute the electrical phase as an angle between $\pm \pi$ radians. This is the equivalent of determining the phase angle for a full cycle of one of the curves shown in FIG. 3 without regard for the particular cycle. To accomplish this, the analog voltage levels on lines 48 and 54 are converted to their absolute values in circuits 60 and 62 respectively. The absolute values from circuits 60 and 62 are applied through lines 64 and 66 to multiplex circuit 68. Circuit 68 determines which of the inputs thereto has the lesser absolute value and passes this lesser absolute value through analog to digital converter 70 to arcsin circuit 72. The value applied to arcsin circuit 72 is a six-bit binary number representing the absolute value of the quantity $e_2$ or $e_3$ whichever has the lower absolute value. In addition to the outputs previously indicated, absolute value circuits 60 and 62 and multiplex circuit 68 apply signals over lines 74, 76 and 78 respectively to octant control circuit 80. The signals on lines 74 and 76 indicate that the input values on the corresponding lines 48 and 54 are greater than zero (i.e. positive) while the signal on line 78 indicates that the absolute value of $e_2$ on line 54 is greater than the absolute value of $e_3$ on line 48. The manner in which this information is used by octant control circuit 80, and the function of this circuit, will be described shortly.

Because the cross-overs between curves shown in FIG. 3 occur at 45°, the value into circuit 72 will never exceed the sine of 45°. Arcsin circuit 72 contains logic elements which convert the input into an angle expressed in $\pi$ radians. With five bits, the electrical phase is given in one quarter $\pi$ radians. Expressed in binary form of this is $0.010000 \, \pi$ radians. The least significant bit is $1/64 \, \pi$ radians $= 2.81°$.

Figures 5A, 5B:
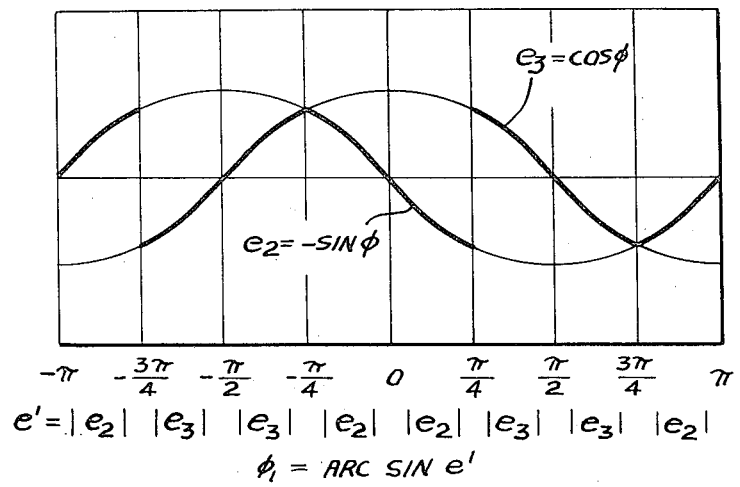
FIG. 5 is a diagram illustrating the octant control logic for the processor shown in FIG. 4.

The $\phi_1$ value on output line 82 from arcsin circuit 72 indicates a phase value within one of the eight 45° curve segments shown in FIG. 5A. FIG. 5A is an enlarged view of one cycle of the curves shown in FIG. 3. Octant control 80 determines which of the eight segments the value $\phi_1$ appears in. This provides the ambiguous principal value of electrical phase ($\phi_P$) on output line 84 from octant logic 86. FIG. 5B indicates the logic employed in octant control circuit 80. The logical combination of bits on the three input lines 74, 76 and 78 indicate the octant as shown on the first three lines of this figure. If a signal appears on output line 88 from circuit 80, indicating that $\phi_P$ is greater than zero, octant logic 86 inserts a minus sign in the eighth bit position of the $\phi_P$ output on line 84. The output on line 90 indicates whether $\phi_1$ is to be added or subtracted from the $\pi$ value on line 92 in octant logic 86 in order to obtain the desired $\phi_P$ value. Seven bits are utilized to represent the magnitude of the $\phi_P$ value obtained from octant logic 86.

The phase ambiguities previously indicated for the $\phi_P$ value on line 84 are resolved by processing the amplitude response on line 32. In doing this, the signal on line 32 is passed through absolute value circuit 94 which generates a magnitude output on line 96 and a sign bit indication on line 98. The signal on line 96 is passed through sine generating circuit 100 to obtain a $\sin \theta_A$ value on line 102. This is the sine of the angle roughly determined by amplitude comparison. This value is applied as one input to difference amplifier circuit 104. It should be noted that $$\sin \theta_A = \phi_U c/2fl = \phi_U f_0/f \quad (15)$$

Where $\sin \theta_A$ is expressed in $\pi$ radians
$\phi_U$ = the unambiguous electrical phase determined from amplitude comparison.
$f$ = the input signal frequency
$f_0 = c/2l$
Similarly
$$\sin \theta_P = \phi_P f_0/f \quad (16)$$

In each of the equations (15) and (16), the proportionality constant is $f_0/f$. Therefore the phase error $$\Delta \phi = \phi_U - \phi_P = (f/f_0) \sin \theta_A - (f/f_0) \sin \theta_P \quad (17)$$

can be determined by forming the product of $f/f_0$ times the difference ($\sin \theta_A - \sin \theta_P$).

The above is implemented by passing the $\phi_P$ signal on line 84 through cycle logic 106, which performs no function at this time, and line 108 to one input of multiplier 110. The frequency of the input signal which is determined by other means and is either inserted by the operator by use of thumb wheel or similar switches, or is the output from another device, appears in binary form on line 112. The signal on line 112 is applied as the denominator input to divider circuit 114, the numerator input to this circuit being a quantity $f_0$ which is inversely proportional to antenna spacing. The resulting output on line 118 is applied as a second input to multiplier 110. The resulting output on line 120 is, at this time, equal to $\phi_P f_0/f$ which, from equation 16, is seen to be the quantity for sin $\theta_P$. This digital value is converted to an analog value in D-to-A converter 122, and applied to polarity amplifier 124 which inverts the input if the signal on line 88 indicates that $\phi_P$ is less than zero. The resulting sin $\phi_P$ value on line 126 is applied as the other input to difference amplifier 104. The output on line 128 from difference amplifier 104 is thus the sin $\theta_A$ − sin $\theta_P$ value required by equation 17.

As may be seen from equations (18) and (19) to follow, the multiplication of this value by $f/f_0$ is implemented by causing this reference voltage to be compared to the value on line 128 in comparitor 130. Line 128 is one input to comparitor 130, the other input to this comparitor being the analog value of $f_0/f$ derived from D-to-A convertor 132. The result of the comparison in comparitor 130 is applied through line 134 to cycle control circuit 136.

Cycle control circuit 136 determines on which of the curves shown in FIG. 3 the selected $\phi_P$ value appears. This is accomplished by either adding or subtracting $\phi_P$ from a multiple of 2 $\pi$. The rules by which the cycle control logic 136 responds are:

If sin $\theta_a$ − sin $\theta_P$ < $f_0/f$ then $\Delta\phi = 0$
If $f_0/f$ < sin $\theta_a$ − sin $\theta_P$ < $3f_0/f$ then $\Delta\phi = 2\pi$
If $3f_0/f$ < sin $\theta_a$ − sin $\theta_P$ < $5f_0/f$ then $\Delta\phi = 4\pi$
If $5f_0/f$ < sin $\theta_a$ − sin $\theta_P$ then $\Delta\phi = 6\pi$ \hfill (18)

Note that these rules are equivalent to:
If $f/f_0$ (sin $\theta_a$ − sin $\theta_P$) < 1 then $\Delta\phi = 0$
If 1 < $f/f_0$ (sin $\theta_a$ − sin $\theta_P$) < 3 then $\Delta\phi = 2\pi$
If 3 < $f/f_0$ (sin $\theta_a$ − sin $\theta_P$) < 5 then $\Delta\phi = 4\pi$
If 5 < $f/f_0$ (sin $\theta_a$ − sin $\theta_P$) then $\Delta\phi = 6\pi$ \hfill (19)

Figure 7:
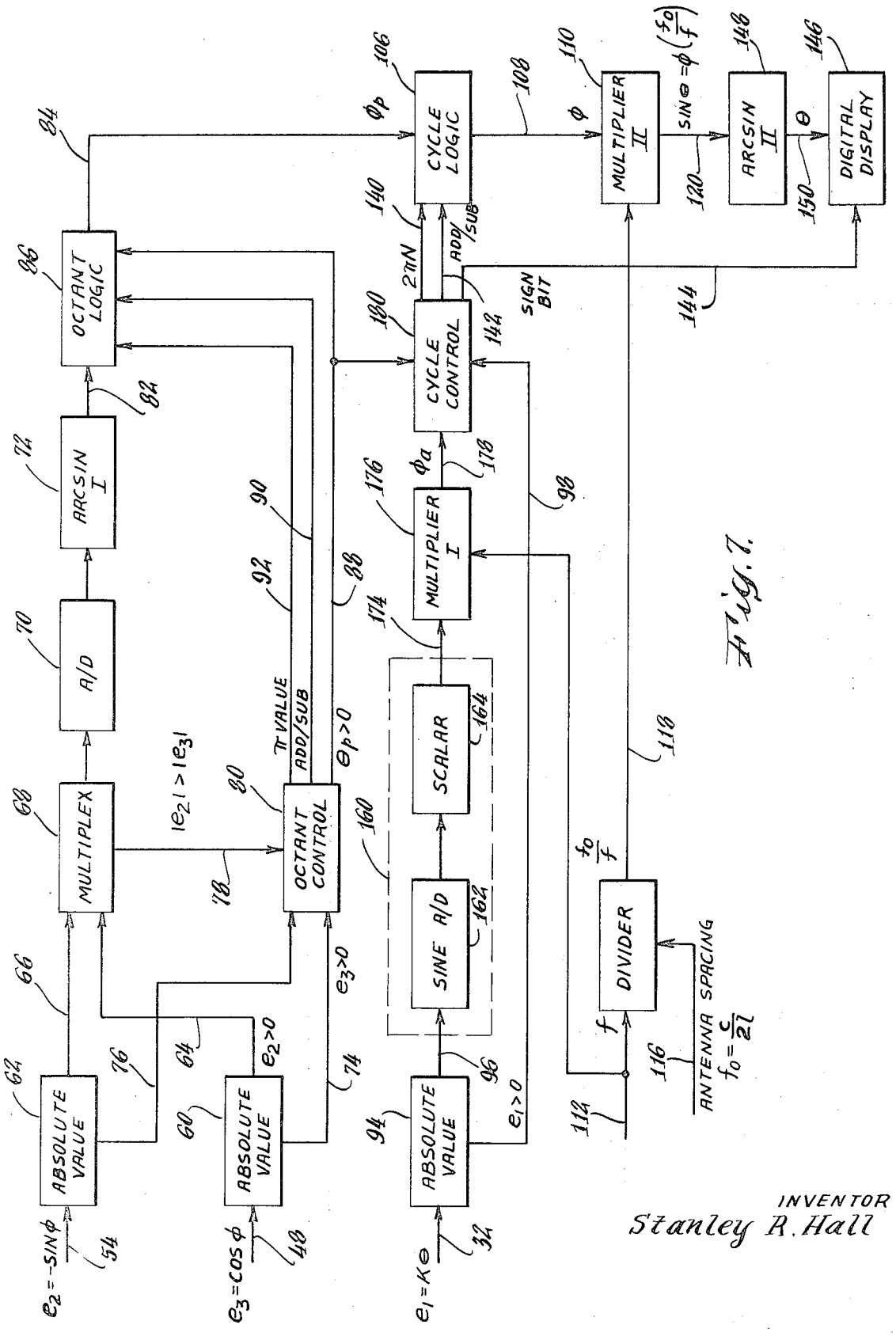
FIG. 7 is a schematic block diagram of the angle processor for an alternative embodiment of the invention.

The decision as to whether the value of $2\pi N$ appearing on output line 140 from cycle control 136 is to have the value of $\phi_P$ added or subtracted from it in cycle logic 106 is determined in the cycle control from the values appearing on $\phi_P$>0 line 88 and $e_1$>0 line 98. For $e_1$>0, FIG. 7 shows that $\phi_P$ is added to $2\pi N$ when it is greater than zero and subtracted from $2\pi N$ when it is less than zero. For $e_1$<0, the add-subtract decision with respect to the sign of $\phi_P$ is reversed. A bit indicating the result of the add-subtract decision in cycle control 136 is applied through line 142 to cycle logic 106. The $e_1$>0 signal on line 98 also determines whether $\theta$ is to the left or right of boresight, or, in other words, the sign of $\theta$. Cycle control 136 applies a bit through line 144 to output display 146 to control the sign generated for this display.

The value on line 140 is a three bit number indicating the number of $\pi$ radians to which the $\phi_P$ value is to be added or subtracted. When this value is combined with the $\phi_P$ value on line 84 in cycle logic 106, the resulting value for $\phi$ on line 108 is the unambiguous electrical phase $\phi$ in $\pi$ radians. Nine bits are utilized to represent this number.

To compute the direction-of-arrival angle $\theta$ from phase, sin $\theta$ is computed from
sin $\theta = \phi c/2fl = \phi f_0/f$ with $\phi$ in $\pi$ radians \hfill (20)

As indicated previously, multiplier 110 is adapted to perform the required multiplication to generate the sin $\theta$ term on line 120.

The final step of the direction-finding processor is to determine the arcsin of the quantity on line 120. This is accomplished in arcsin circuit 148. While a variety of known circuits may be utilized for performing this function, for preferred embodiments of the invention this is accomplished by interrogating all possible memory addresses of a read-only memory until the sin response for the read-only memory equals that calculated and appearing on line 120. The address for this condition is a measure of the bearing angle. With a nine bit address, 512 possible combinations covering a 90° field of view are generated. Therefore, each address count is 90/512 = 0.17578125°. This may be rounded off to the nearest 0.2° if desired with suitable gating and clocking circuits.

The desired value of $\theta$ determined in circuit 148 is applied through line 150 to digital display device 146 where it is combined with the sign value on line 144 to generate an accurate, unambiguous indication of the bearing angle of the received input.

DETAILED DESCRIPTION OF FIRST ALTERNATIVE EMBODIMENT

FIG. 7 shows the angle processor for an alternative embodiment of the invention. This circuit functions in substantially the same manner as the circuit shown in FIG. 4 except for the manner in which the angle determined by amplitude comparison is utilized to resolve ambiguity. The same reference numerals have been utilized to designate like elements in the two figures.

Referring now to FIG. 7, it is seen that the $e_2$ and $e_3$ values on lines 48 and 54 are utilized in the same manner as indicated previously to generate a primary value of phase ($\phi_P$) indication on line 84. As indicated previously, this value is ambiguous since it is not known which of the cycles shown in FIG. 3 this determined value occurs on.

Figures 8, 9:
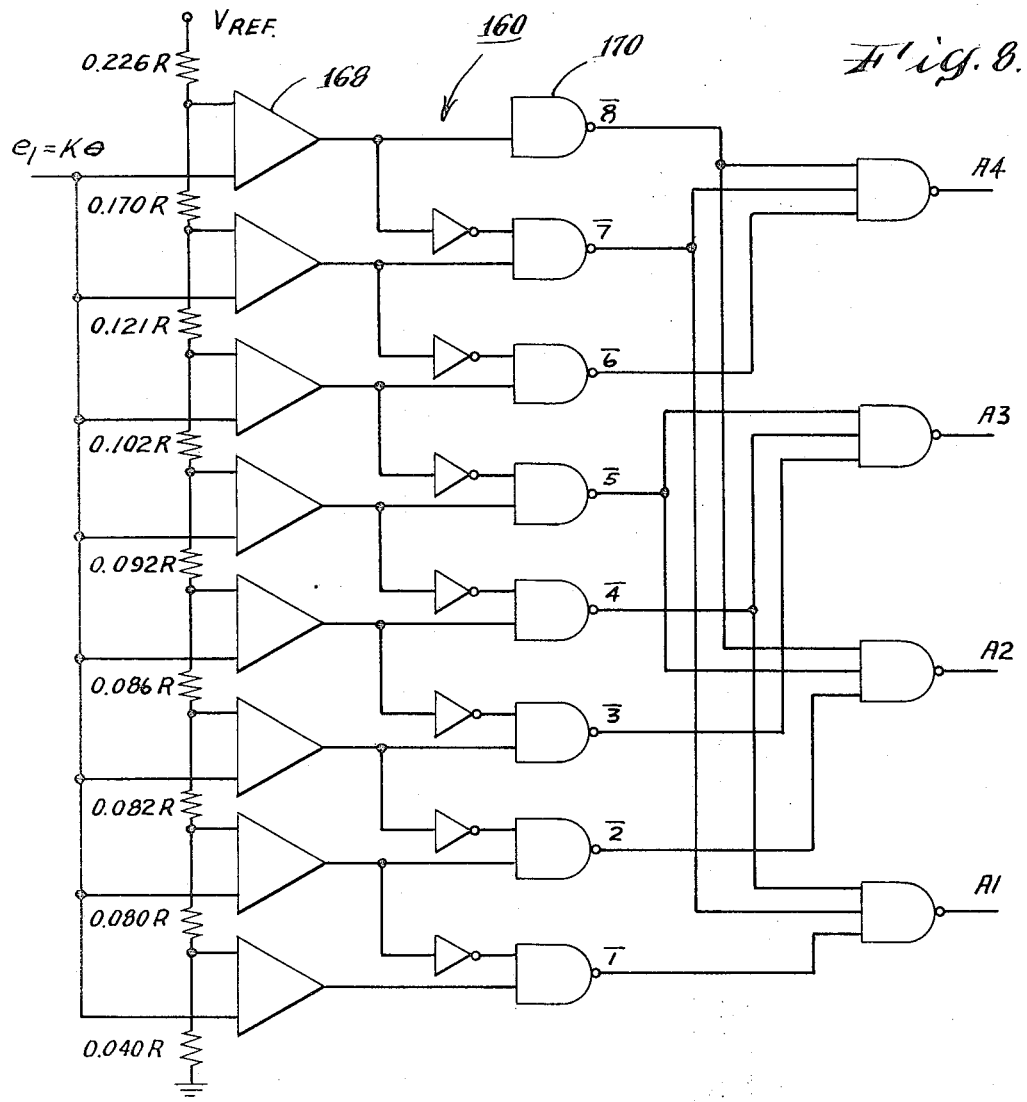
FIG. 8 is a schematic semi-block diagram of a sine-A/D converter, and scaler suitable for use in the embodiment of the invention shown in FIG. 7.
FIG. 9 is a table illustrating the operations of the circuit shown in FIG. 8.

The phase ambiguities are resolved by processing the amplitude channel to determine an approximate value of unambiguous phase $\phi_U$. For the embodiment of the invention shown in FIG. 7 this is accomplished by dividing the field of view up into eight segments and determining from the value appearing on line 32 the proper segment for the received signal. This is accomplished by applying the absolute value of $e_1$ on line 96 to a circuit 160 which includes a sine generating and A-to-D convertor circuit 162 and a scaler 164. FIG. 8 is a schematic diagram of the circuit 160. From FIG. 8, it is seen that the A/D convertor divides the $e_1$ input into eight regions, giving equally spaced intervals in the sine of the bearing angle as controlled by the unequal resistor weights of the reference ladder. Thus, for a given input value, all of the gates 168 below a particular point in the circuit will generate an output resulting in only one of the gates 170 generating an output. From FIG. 9 it is seen that this value may be expressed in binary to represent sin $\theta$. However, from equation 15, it is seen that $\phi_U$ is equal to sin $\theta$ multiplied by $f/f_0$. The division by the constant $f_0$ is incorporated into circuit 160. With antenna spacing of 0.3m the value of $f_0$ is 50 × $10^7$ Hz. With this value for $f_0$, FIG. 9 shows the resulting output from scaler 164, and thus from circuit 160, on line 174. The multiplication by $f$ to obtain $\phi_U$ is performed in binary multiplier 176.

The value of $\phi_U$ on line 178 is applied to cycle control circuit 180 which utilizes the inputs on lines 88 and 98 in the manner indicated for cycle control circuit 136 of FIG. 4 to determine whether the value of $\phi_P$ on line 84 is to be added or subtracted from the two most significant bits of the $\phi_U$ term on line 178 in cycle control logic 106. The two most significant bits of the $\phi_U$ term represent the desired multiple of $\pi$ radians for ambiguity resolution.

The output from cycle logic 106 on line 108 is processed in a manner identical to that previously described in connection with FIG. 4 to obtain an indication of the desired angle $\theta$.

DETAILED DESCRIPTION OF SECOND ALTERNATIVE EMBODIMENT

Figure 10:
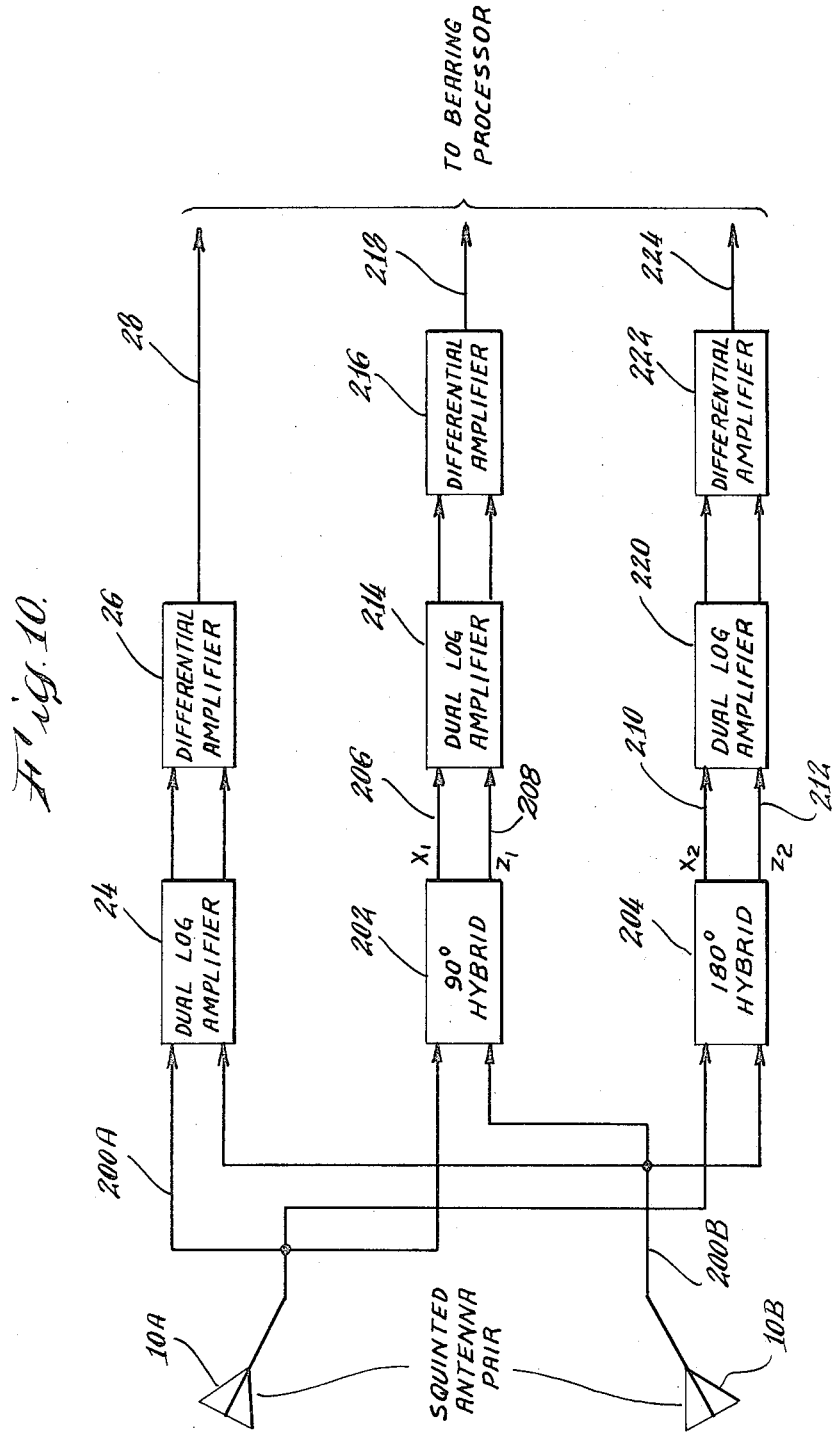
FIG. 10 is a schematic block diagram of the antenna and receiver subsystems for a second alternative embodiment of the invention.
Figure 11:
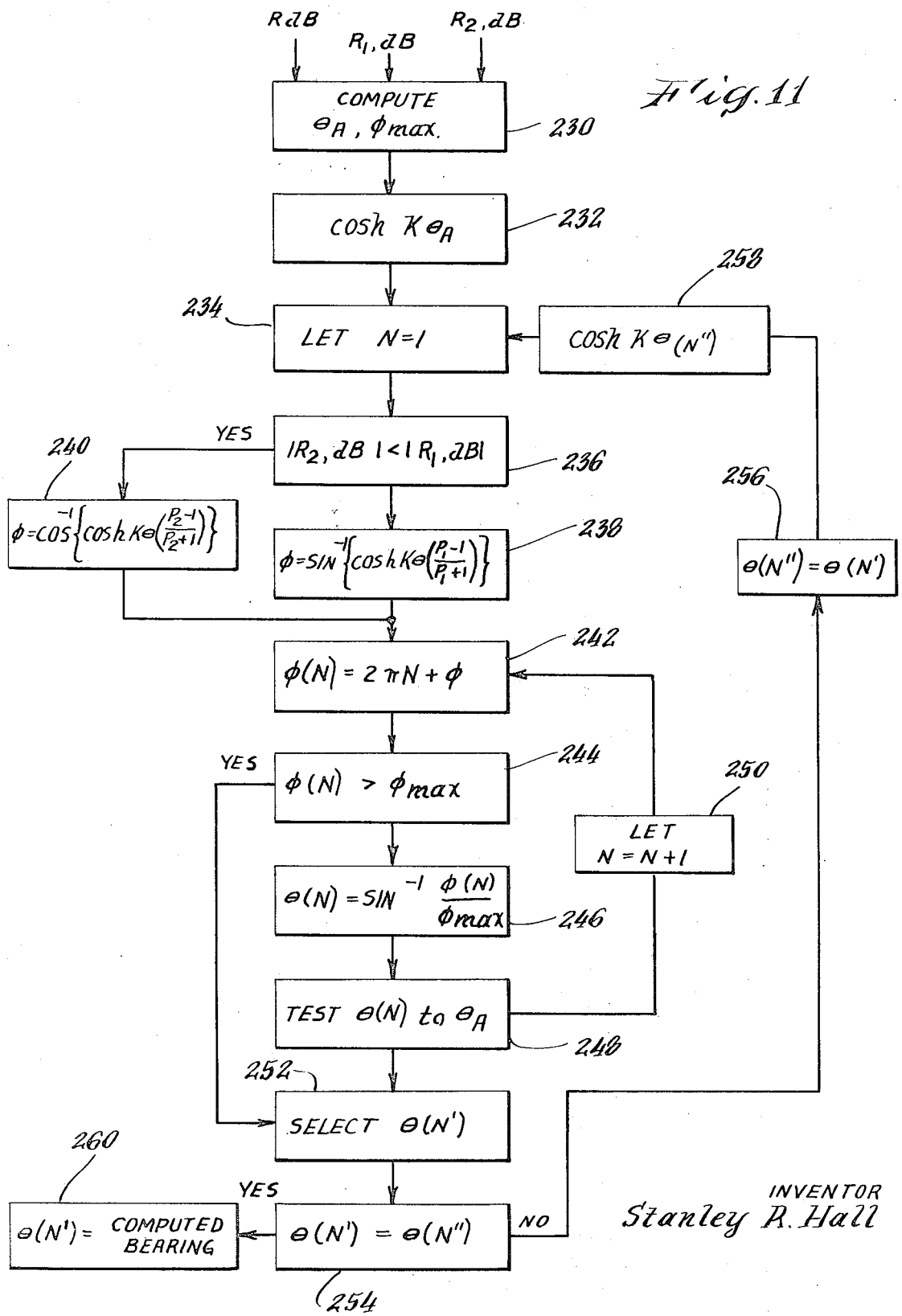
FIG. 11 is a detailed flow diagram of the angle processor utilized with the embodiment of the invention shown in FIG. 10.

In the embodiments of the invention described so far, direct phase comparison has been utilized in computing the bearing angle. It is also possible to compute the bearing angle by converting input phase into amplitude and performing the processing using amplitude comparison. FIG. 10 is a diagram of the antenna and receiver subsystem for an embodiment of the invention utilizing this approach and FIG. 11 is a flow diagram for the processor utilized for this embodiment of the invention.

Referring now to FIG. 10, the outputs from the antenna 10 may be applied through mixers as shown in FIG. 1 or may be applied directly through lines 200 to the inputs of dual log amplifier circuits 24, 90° hybrid circuit 202, and 180° hybrid circuit 204. The log amplifiers 24 and differential amplifier 26 function in a manner identical to that described with reference to FIG. 2 to generate a signal $e_1 = K\theta$ on line 28.

If the signal on line 200A is regarded as A and the signal on line 200B as B, then the 90° hybrid 202 is characterized by the following relationship:

$X_1$ = signal on line 206 = $1/\sqrt{2}$ (A − jB)  (21)
$Z_1$ = signal on line 208 = $1/\sqrt{2}$ (B − jA)  (22)

Similarly, the 180° hybrid 204 is characterized by the following relationship:

$X_2$ = signal on line 210 = $1/\sqrt{2}$ (A + B)  (23)
$Z_2$ = signal on line 212 = $1/\sqrt{2}$ (A − B)  (24)

If A is equal to $V_2$ (cos $\phi$ − j sin $\phi$) and B is equal to $V_1$ where $\phi$ is the phase between $V_1$ and $V_2$, then from equations 21 and 22, $X_1 = 1/\sqrt{2}\ V_2 (\cos \phi - j \sin \phi) - j V_1$
$= 1/\sqrt{2}\ V_2 \cos \phi - j (V_1 + V_2 \sin \phi)$  (25)
$Z_1 = 1/\sqrt{2}\ [V_1 - jV_2 (\cos \phi - j \sin \phi)]$
$= 1/\sqrt{2}\ (V_1 - V_2 \sin \phi - j V_2 \cos \phi)$  (26)

Similarly the response for the 180° hybrid 204 is:
$X_2 = 1/\sqrt{2}\ V_2 (\cos \phi - j \sin \phi) + V_1$  (27)
$Z_2 = 1/\sqrt{2}\ V_2 (\cos \phi - j \sin \phi) - V_1$  (28)

If the magnitudes of the 90° hybrid responses are squared, the resulting values are:

$$X_1^2 = \frac{1}{2} V_2^2 \cos^2 \phi + (V_1 + V_2 \sin \phi)^2$$

$$= V_1 V_2 \frac{\frac{V_1}{V_2}+\frac{V_2}{V_1}}{2} + \sin \phi \quad (29)$$

$$Z_1^2 = \frac{1}{2}(V_1 - V_2 \sin \phi)^2 + V_2^2 \cos^2 \phi$$

$$= V_1 V_2 \frac{\frac{V_1}{V_2}+\frac{V_2}{V_1}}{2} - \sin \phi \quad (30)$$

Since $V_1 = E_R$ and $V_2 = E_L$ then the ratio of $V_1$ to $V_2$ as derived by use of equation (9) is:

$$\frac{V_2}{V_1} = e^{\{-5.552[(\theta \theta_S)/(\theta_B^2)]\}} \quad (31)$$

Therefore, $$\frac{1}{2}\frac{V_1}{V_2}+\frac{V_2}{V_1} = \frac{1}{2} e^{\{5.552[(\theta \theta_S)/(\theta_B^2)]\}} + e^{\{-5.552[(\theta \theta_S)/(\theta_B^2)]\}}$$

$$= \cosh \{5.552[(\theta \theta_S)/(\theta_B^2)]\} \quad (32)$$

Then,
$X_1/Z_1^2 = (\cosh \{5.552[(\theta \theta_S)/(\theta_B^2)]\} + \sin \phi)/(\cosh \{5.552[(\theta \theta_S)/(\theta_B^2)]\} - \sin \phi)$  (33)

The ratio expressed in dB($R_{1,dB}$) is
$R_{1,dB} = 10 \log (X_1^2/Z_1)$
$= 10 \log (\cosh \{5.552[(\theta \theta_S)/(\theta_B^2)]\} + \sin \phi)/(\cosh \{5.552[(\theta \theta_S)/(\theta_B^2)]\} - \sin \phi)$  (34)

Since the $X_1$ and $Z_1$ signals on lines 206 and 208 are applied through a dual log amplifier 214 and a differential amplifier 216, it can be seen that the output from the differential amplifier on line 218 is substantially the quantity $R_{1,dB}$ shown above in equation 34.

Similarly, for the 180° hybrid, the squared responses are:
$X_2^2 = V_1 V_2\ \frac{1}{2}\ (V_1/V_2) + (V_2/V_1) + \cos \phi$  (35)
$Z_2^2 = V_1 V_2\ \frac{1}{2}\ (V_1/V_2) + (V_2/V_1) - \cos \phi$  (36)

From equation 31,
$X_2/Z_2^2 = (\cosh \{5.552[(\theta \theta_S)/(\theta_B^2)]\} + \cos \phi)/(\cosh \{5.552[(\theta \theta_S)/(\theta_B^2)]\} - \cos \phi)$  (37)

Therefore, the ratio expressed in dB($R_{2,dB}$) is
$R_{2,dB} = -10 \log (\cosh \{ 5.552[(\theta \theta_S)/(\theta_B^2)] \} + \cos \phi)/(\cosh \{5.552[(\theta \theta_S)/(\theta_B^2)]\} - \cos \phi)$  (38)

Since lines 210 and 212 are applied through dual log amplifier 220 and differential amplifier 222, the resulting output on line 224 is substantially the quantity shown above in equation 38.

FIG. 12 is an illustration of the outputs under the conditions indicated for positive bearing angles of the lines 28, 218 and 224. The antenna spacing for this drawing is 4 λ. It is seen that with this approach, the response curves tend to have less slope, and thus less accuracy, as the phase angle increases. The accuracy is, however, still far greater than can be obtained using either phase comparison or amplitude comparison alone. As with FIG. 3, maximum slope is obtained by operating at any given time with the response having the smallest absolute value.

For purposes of defining the hybrid processor required for this embodiment of the invention, the signal on line 28, now defined as RdB, and the constant $k$ may be defined as in equation 12 above. With $k$ defined in this way, equation 34 may be rewritten as:

$$R_{1,dB} = 10 \log (\cosh k\theta + \sin \phi)/(\cosh k\theta - \sin \phi) \quad (39)$$

And equation 38 may be rewritten as:

$$R_{2,dB} = 10 \log (\cosh k\theta + \cos \phi)/(\cosh k\theta - \cos \phi) \quad (40)$$

With the inputs defined as indicated above, the hybrid processor takes the form of a small computer, the program flow diagram of which is shown in FIG. 11. Referring to FIG. 11, it is seen that the first step in the operation, step 230, is to calculate the approximate bearing angle ($\theta_A$) from the following equation:

$$\theta_A = R_{dB}/8.68 \, k \quad (41)$$

At the same time, the maximum possible phase ($\phi_{max}$) is computed as:

$$\phi_{max} = 2\pi \, fl/c \quad (42)$$

The next step in the operation, step 232, is to find the cosh of $k\theta_A$, $\theta_A$ being that computed in step 230. In the remaining operations, to be now described, the values computed above are utilized to determine the precise value of $\theta$ utilizing a successive approximation technique.

This process is begun in step 234 by setting a parameter N equal to one. N represents the number of $2\pi$ radians which are to be added to an ambiguous value of $\phi$ in order to obtain an unambiguous value of $\phi$. As will be seen, various values of N are tried until the one giving a $\theta$ reading closest to $\theta_A$ is found.

The next step in the operation, step 236, is to determine whether $R_{2,dB}$ is greater than $R_{2,dB}$. As was indicated previously, the quantity having the lesser absolute value is the one which is utilized. At this point the hybrid response ratios given by equations 39 and 40 are converted to give $$P_1 = \text{antilog} \, (R_{1,dB}/10) \quad (43)$$
$$P_2 = \text{antilog} \, (R_{2,dB}/10) \quad (44)$$

Combining equation 39 with equation 43 and combining equation 40 with equation 44, electrical phase is defined as $$\phi = \sin^{-1} \cosh k\theta \, (P_1 - 1)/(P_1 + 1) \quad (45)$$
$$\phi = \cos^{-1} \cosh k\theta \, (P_2 - 1)/(P_2 + 1) \quad (46)$$

For the first cycle of electrical phase $\theta$ will be set equal to $\theta_A$ and the cosh $k\theta_A$ term computed in step 232 may be utilized. If the absolute value of $R_{1,dB}$ is less than the absolute value of $R_{2,dB}$, equation 45 applies and the computation indicated in step 238 is performed as the next step in the operation. If $R_{1,dB}$ is greater than $R_{2,dB}$, equation 46 applies and the program branches to step 240.

In step 242 the phase computed in step 238 or 240 is stepped by $2\pi$ radians. As will be seen, this stepping of $\phi$ proceeds with successively increasing values of N until a value of $\phi$ (N) is reached which is greater than the value of $\phi_{max}$ computed in step 230 and defined in equation 42. The next step in the operation, step 244, is thus to determine if $\phi$ (N) is greater than $\phi_{max}$. If it is not, then a value $\theta$ (N) is computed in step 246. The equation for $\theta$ (N) may be obtained from equations 20 and 42. Thus $$\theta (N) = \sin^{-1} (\phi(N)C/2\pi fl) = \sin^{-1}(\phi(N)/\phi_{max}) \quad (47)$$

In step 248, each value of $\theta$ (N) as computed above is compared with $\theta_A$ and the difference stored. N is then increased by one in step 250 and steps 244–248 repeated. This cycle is repeated for increasing values of N until, during step 244, an indication is received that the $\phi$ (N) now generated is greater than $\phi_{max}$. When this occurs, the program branches to step 252 during which the value of $\theta$ (N) which caused the absolute value of $\theta_A - \theta(N)$ to be a minimum is selected.

The remainder of the operation involves utilizing the value of $\theta(N)$ selected in step 252 to replace $\theta_A$ in step 238 or 240 and to select a new $\theta(N')$ as a result of this recomputation. The recomputation is iteratively repeated until the selected $\theta(N')$ is equal to the $\theta(N')$ utilized for computation purposes in steps 238 and 240. When this equality occurs, the selected value of $\theta(N')$ is indicated to be the computed bearing angle.

Thus, in step 254, a determination is made as to whether $\theta(N')$ is equal to $\theta(N'')$. If these quantities are not equal, then $\theta(N'')$ is set equal to the selected $\theta(N')$ in step 256 and cosh $k\theta(N'')$ is computed in step 258. The program then branches to step 234 and steps 234 through 254 are repeated for the new value of $\theta$. This process is repeated with new values of $\theta(N'')$ until, during a comparison in step 254, an equals indication is received. The circuit then branches to step 260 during which $\theta(N')$ is indicated as the computed bearing angle.

It is thus seen that a method and apparatus has been provided for generating extremely accurate (to within a small fraction of a degree) bearing angle measurements which are relatively insensitive to small measurement or computational errors. Since the system requires only a single pair of antennas, the antenna and receiver subsystems are relatively simple and inexpensive. The processor subsystems are also reasonably straight forward and may be implemented either with relatively inexpensive special purpose hardware or by a programmed general purpose processor where one is available for other purposes.

While various processing algorithms have been described above with reference to preferred embodiments of the invention, it is apparent that other, similar, processing algorithms might be utilized. Simillarly, while specific hardware and parameter values have been indicated above for illustrative embodiments of the invention, equivalent hardware might be utilized and the parameters might be varied in accordance with the system application.

Thus, while the invention has been particularly shown and described with reference to preferred embodiments thereof, it will be understood by those skilled in the art that the foregoing and other changes in form and details may be made therein without departing from the spirit and scope of the invention.

What is claimed is:

1. A system for determining the direction of arrival of an electrical signal within a field of view comprising:

a single pair of squinted antennas spaced by a distance greater than one-half wavelength for the maximum frequency of signal applied to the system;

means for determining the difference in amplitude and the difference in phase of said signal as received at said antennas;

means responsive to the determined phase difference for generating an ambiguous indication of said direction comprising two phase response signals;

means responsive to the determined amplitude difference for generating an unambiguous indication of said direction; and means for utilizing the phase response signal of said unambiguous direction indication having the lowest absolute value to resolve the ambiguity of said ambiguous indication.

2. A system for determining the direction of arrival of an electrical signal within a field of view comprising:

a single pair of squinted antennas spaced by a distance greater than one-half wavelength for the maximum frequency of signal applied to the system;

meas for determining the difference in amplitude and the difference in phase of said signal as received at said antennas;

means responsive to the determined phase difference for generating an ambiguous indication of said direction;

means responsive to the determined amplitude difference for generating an unambiguous indication of said direction; and means for utilizing said unambiguous direction indication to resolve the ambiguity of said ambiguous indication;

said phase response determining means generating at least one multicycle phase response signal for signals applied to the system over the system field of view;

said ambiguous indication being a phase indication which may appear on more than one of said response cycles;

said ambiguity resolving means including means for determining the cycle of the phase response signal on which said indication appears.

3. A system of the type described in claim 2 wherein said ambiguity resolving means includes means for determining the multiple of $2\pi$ by which said ambiguous indication differs from the unambiguous indication, and means for adding said ambiguous indication to, or subtracting said ambiguous indication from, the determined multiple of $2\pi$.

4. A system of the type described in claim 2 wherein there are two phase response signals, one a sine wave and the other a cosine wave;

wherein only the phase response signal having the lowest absolute value is utilized by said ambiguous indication generating means; and wherein said ambiguous indication generating means includes means for generating the arcsin of the utilized phase response signal, and means responsive to the phase response signal utilized and whether the phase response signal is positive or negative for determining the octant of the generated arcsin value in a cycle of the waveform.

5. A system of the type described in claim 3 wherein said ambiguity resolving means includes means for selecting the multiple (N) of $2\pi$ to be utilized, said means including means for forming the effective difference ($\Delta\phi$) in $\pi$ radians between unambiguous phase related to said unambiguous indication and ambiguous phase related to said ambiguous indication, and logic means for selecting N in accordance with the following relationship:

$2N-1 < \Delta\phi < 2N+1$ .

6. A system of the type described in claim 3 wherein said ambiguous indication is a phase value which may be positive or negative; and including means responsive to the sign of said phase value for determining whether said phase value is to be added or subtracted from the determined multiple of $2\pi$.

7. A system of the type described in claim 2 wherein said unamibiguous indication generating means includes means responsive to said determined amplitude difference for generating an indication of one of M regions within said field of view; and wherein said ambiguity resolving means includes means for adding or subtracting said ambiguous indication from at least part of said region indication to obtain an indication of said direction.

8. A system of the type described in claim 2 wherein said direction is given as an angle relative to system boresight;

including means for determing the sign of the determined amplitude difference; and means responsive to said determined sign for indicating the side of boresight for said direction of arrival.

9. A system of the type described in claim 2 wherein said amplitude difference determining means includes means for obtaining the logarithm of the amplitude response of each of said antennas, and means for generating the difference of said logarithm, whereby the logarithm of the ratio of said amplitude responses is obtained.

10. A system of the type described in claim 2 wherein said phase difference determining means includes means for limiting the signals from said antennas to remove amplitude effects, and means for phase detecting the limited antenna outputs, the response of said phase detecting means being $\cos \phi$, where $\phi$ is the phase difference between the signals from the antennas.

11. A system of the type described in claim 10 wherein said phase difference determining means includes means for delaying the phase of one of the limited antenna outputs by 90°, and means for phase detecting the delayed limited output with the other limited output, the output from said phase detecting means being equal to $-\sin \phi$.

12. A system for determining the direction of arrival of an electrical signal within a field of view comprising:

a single pair of squinted antennas;

means for determining the difference in amplitude and the difference in phase of said signal as received at said antennas;

means responsive to the determined phase difference for generating an ambiguous indication of said direction;

means responsive to the determined amplitude difference for generating an unambiguous indication of said direction; and means for utilizing said unambiguous direction indication to resolve the ambiguity of said ambiguous indication;

said phase difference determining means including a 90° hybrid and a 180° hybrid, the signals from both of said antennas being applied to both of said hybrids, and means for generating the log of the ratio of the responses from each of said hybrids.

13. A system for determining the angle of arrival of an electrical signal within a field of view comprising:
means for generating two separate multi-cycle phase response signals for input signals applied to said system over its field of view and also including means for selecting the phase response signal generated for a given signal which has the lowest absolute value, there thus being an ambiguity as to the correct response cycle for the response signals generated for a given input signal;
means for generating an amplitude response ratio for a signal applied to said system, said means generating a linear response ratio for input signals applied to said system over its field of view; and
means for utilizing said amplitude response ratio to resolve the ambiguity of said phase response ratio.

14. A system of the type described in claim 13 wherein a single pair of squinted antennas are utilized by both said phase and amplitude response generating means.

15. A system of the type described in claim 14 wherein each of said antennas has an amplitude response; and
wherein said amplitude response ratio is a logarithmic function of said amplitude responses.

16. A system of the type described in claim 13 wherein said angle is relative to system boresight; including
means for determining the sign of a generated amplitude response ratio; and
means responsive to said determined sign for indicating the side of boresight for said angle of arrival.

17. A system for determining the angle of arrival of an electrical signal within a field of view comprising:
means for generating a phase response signal for a signal applied to said system, said means generating a multi-cycle response signal for input signals applied to said system over its field of view, there thus being an ambiguity as to the response cycle for the response ratio generated for a given input signal;
means for generating an amplitude response ratio for a signal applied to said system, said means generating a linear response ratio for input signals applied to said system over its field of view;
means for utilizing said amplitude response ratio to resolve the ambiguity of said phase response signal;

said ambiguity resolving means including means responsive to said amplitude response ratio for deriving a first value representing said angle;
means responsive to said phase response signal for deriving a second value representing said angle;
means for determining the multiple of $2\pi$ by which said first and second values differ; and
means for adding said second value to, or subtracting said second value from, the determined multiple of $2\pi$.

18. A method for determining the direction of arrival of an electrical signal comprising the steps of:

determining the difference in amplitude and the difference in phase of said signal as received at a single pair of squinted antennas;
generating from said determined phase difference an ambiguous indication of said direction comprising two phase response signals;
selecting the phase response signal having the lowest absolute value generating from said determined amplitude difference an unambiguous indication of said direction; and
utilizing said unambiguous indication to resolve the ambiguity of said ambiguous indication.

19. A method for determining the direction of arrival of an electrical signal comprising the steps of:
determining the difference in amplitude and the difference in phase of said signal as received at a single pair of squinted antennas;
generating from said determined phase difference an ambiguous indication of said direction;
generating from said determined amplitude difference an unambiguous indication of said direction;

utilizing said unambiguous indication to resolve the ambiguity of said ambiguous indication;
said first mentioned step of generating producing a phase response signal such that a plot of said phase response signal for signals applied to the system versus direction of arrival over the system field of view yields at least one multicycle waveform and wherein said ambiguous indication is a phase indication which may appear on more than one of said phase response cycles; and
said ambiguity resolving step including the step of determining the cycle of the phase response ratio on which said indication appears.

20. A method of the type described in claim 19 wherein said ambiguity resolving step includes the steps of determining the multiple of $2\pi$ by which said ambiguous indication differs from the unambiguous indication, and the step of adding said ambiguous indication to, or subtracting said indication from, the determined multiple of $2\pi$.

21. A method of the type described in claim 19 wherein there are two phase response signals, one a sine wave and the other a cosine wave;
wherein only the phase response signal having the lowest absolute value is utilized during said ambiguous indication generating step; and
wherein said ambiguous indication generating step includes the steps of generating the arcsin of the utilized response signal, and determining the octant of the generated arcsin value in a cycle of the waveform from information relating to the response signal utilized and whether the response signal is positive or negative.

22. A method of the type described in claim 20 wherein said ambiguity resolving step includes the steps of selecting the multiple (N) of $2\pi$ to be utilized, said step including the step of forming the effective difference ($\Delta\phi$) in $\pi$ radians between unambiguous phase related to said unambiguous indication and ambiguous phase related to said ambiguous indication, and selecting N in accordance with the following relationship:
$2N-1 < \Delta\phi < 2N+1$.

23. A method of the type described in claim 20 wherein said ambiguous indication is a phase value which may be positive or negative; and including the step of determining whether said phase value is to be added or subtracted from the determined multiple of $2\pi$ in response to the sign of the phase value.

24. A method of the type described in claim 19 wherein said unambiguous indication generating step includes the step of utilizing determined amplitude difference for generating an indication of one of M regions within said field of view; and
   wherein said ambiguity resolving step including the step of adding or subtracting said ambiguous indication from at least part of said region indication to obtain an indication of said direction.

25. A method of the type described in claim 19 wherein said direction is given as an angle relative to system boresight;
   including the steps of determining the sign of the determined amplitude difference; and
   utilizing said determined sign for indicating the side of boresight for the direction of arrival.

26. A method of the type described in claim 19 wherein said amplitude difference determining the step includes the steps of generating the logarithm of the amplitude response of each of said antennas, and generating the difference of said logarithms, whereby the logarithm of the ratio of said amplitude responses is obtained.

27. A method of the type described in claim 19 wherein said phase difference determining step includes the steps of limiting the signals from said antennas to remove amplitude effects, and phase detecting the limited antenna outputs, the response from said phase detecting step being $\cos \phi$, where $\phi$ is the phase difference between the signals from the antenna.

28. A method of the type described in claim 23 wherein said phase difference determining step includes the steps of delaying the phase of one of the limited antenna outputs by 90°, and phase detecting the delayed limited output with the other limited output, the result of said phase detecting step being equal to $-\sin \phi$.

29. A method of the type described in claim 19 wherein said phase difference determining step includes the steps of applying the outputs from both antennas to a 90° hybrid, applying both antenna outputs to a 180° hybrid, and generating the log of the ratio of the responses from each of said hybrids.

30. A method of the type described in claim 29 wherein said ambiguity resolving step includes the steps of determining which of said hybrid response ratios has the lower absolute value, utilizing the hybrid response ratio determined above in conjunction with an unambiguous indication determined from said amplitude difference to generate an ambiguous indication of direction, adding multiples of $2\pi$ to said determined value, determining the sum of the above addition which gives an indication most nearly equal to the unambiguous indication, repeating the preceding three steps with the determined sum in place of the unambiguous value, and repeating the above four steps until the determined sum is the same as the value utilized in the first repeated step to generate the sum.

31. A method for determining the angle of arrival of an electrical signal within a field of view comprising the steps of:
   generating two separate phase response signals for a signal applied to said system and selecting the phase response signal generated for a given signal which has the lowest absolute value each of said phase response signals having multiple cycles for input signals applied to said system over its field of view, there thus being an ambiguity as to the response cycle for the response signal generated for a given input signal;
   generating an amplitude response ratio for a signal applied to said system, said ratio having a linear response for input signals applied to said system over its field of view; and
   utilizing said amplitude response ratio to resolve the ambiguity of said phase response ratio.

32. A method of the type described in claim 31 wherein a single pair of squinted antennas are utilized to generate inputs for both said phase and amplitude response ratio generating steps.

33. A method for determining the angle of arrival of an electrical signal within a field of view comprising the steps of:
   generating a phase response signal for a signal applied to said system, said signal having multiple cycles for input signals applied to said system over its field of view, there thus being an ambiguity as to the response cycle for the response signal generated for a given input signal;
   generating an amplitude response ratio for a signal applied to said system, said ratio having a linear response for input signals applied to said system over its field of view; and
   utilizing said amplitude response ratio to resolve the ambiguity of said phase response ratio;
   said ambiguity resolving step including the steps of deriving a first value representing said angle in response to said amplitude response ratio, deriving a second value representing said angle in response to said phase response signal, determining the multiple of $2\pi$ by which said first and second values differ, and adding said second value to, or subtracting said second value from, the determined multiple of $2\pi$.

* * * * *